United States Patent
Murakami et al.

(10) Patent No.: US 11,223,385 B1
(45) Date of Patent: Jan. 11, 2022

(54) OPTICAL APPARATUS AND OPTICAL RECEIVING METHOD

(71) Applicant: FUJITSU LIMITED, Kawasaki (JP)

(72) Inventors: Shoichi Murakami, Kawasaki (JP); Taku Saito, Kawasaki (JP); Kosuke Komaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/232,180

(22) Filed: Apr. 16, 2021

(30) Foreign Application Priority Data

Jun. 29, 2020 (JP) .............................. JP2020-111761

(51) Int. Cl.
*H04B 10/08* (2006.01)
*H04B 1/60* (2006.01)
*H04B 10/079* (2013.01)

(52) U.S. Cl.
CPC ......... *H04B 1/60* (2013.01); *H04B 10/07955* (2013.01)

(58) Field of Classification Search
CPC .. H04B 10/07955; H04B 10/60; H04B 10/616; H04B 10/0775; H04B 10/07957; H04B 10/0797; H04B 10/0799; H04B 10/572; H04B 10/61; H04B 10/615; H04B 10/6931; H04J 14/0221; H04J 14/02; H04J 14/06
USPC .............. 398/38, 25, 158, 160, 162, 94, 197
See application file for complete search history.

(56) References Cited

U.S. PATENT DOCUMENTS

| | | |
|---|---|---|
| 2010/0123949 A1 | 5/2010 | Naito et al. |
| 2015/0256252 A1* | 9/2015 | Clouet ............... H04B 10/0775 398/38 |
| 2016/0164624 A1 | 6/2016 | Yamauchi |
| 2016/0248513 A1 | 8/2016 | Saito et al. |
| 2017/0126315 A1* | 5/2017 | Saito .................... H04B 10/572 |
| 2017/0257182 A1* | 9/2017 | Yamauchi .............. H04B 10/61 |

FOREIGN PATENT DOCUMENTS

| | | |
|---|---|---|
| JP | 2010-123698 A | 6/2010 |
| JP | 2016-154297 A | 8/2016 |
| WO | 2015/004828 A1 | 1/2015 |

* cited by examiner

*Primary Examiner* — Hibret A Woldekidan
(74) *Attorney, Agent, or Firm* — Fujitsu Patent Center

(57) ABSTRACT

An optical apparatus includes an attenuator, a photoelectric convertor, an amplifier, and a processor. the attenuator attenuates signal light. The photoelectric convertor converts the signal light attenuated by the attenuator into an electric signal. The amplifier adjusts a gain of the electric signal. The processor detects a monitor value of a target channel from an output signal of the amplifier, calculates a power value of the target channel from the detected monitor value, calculates a difference value between the power value and a target power value, calculates a attenuation amount by adding a current attenuation amount, which is currently set to the attenuator, to the difference value, controls the gain of the amplifier so that the difference value of the target channel is minimized when the set attenuation amount is less than zero, and sets the attenuation amount to the attenuator when the attenuation amount is zero or more.

10 Claims, 13 Drawing Sheets

OPTICAL APPARATUS AND OPTICAL RECEIVING METHOD

CROSS-REFERENCE TO RELATED APPLICATION

This application is based upon and claims the benefit of priority of the prior Japanese Patent Application No. 2020-111761, filed on Jun. 29, 2020, the entire contents of which are incorporated herein by reference.

FIELD

The embodiment discussed herein is related to an optical apparatus and an optical receiving method.

BACKGROUND

FIG. 8 is an explanatory diagram illustrating an example of an optical receiving device 100 of a related example. The optical receiving device 100 illustrated in FIG. 8 is, for example, a digital coherent receiving device that receives an optical signal having a 60 G baud rate. The optical receiving device 100 includes an input terminal 111, a slow response variable optical attenuator (VOA) 112, a polarization beam splitter (PBS) 113, a beam splitter (BS) 114, and a local oscillation light source 115, The optical receiving device 100 includes a first hybrid circuit 116A, a second hybrid circuit 1168, first to fourth photo diodes (PDs) 117A to 117D, and first to fourth trans impedance amplifiers (TIAs) 118A to 118D. The optical receiving device 100 includes first to fourth automatic gain controls (AGCs) 119A to 119D, a digital signal processor (DSP) 120, and a field programmable gate array (FPGA) 130.

The input terminal 111 is a port to which received light is input. The slow response VOA 112 is an attenuator that absorbs slow power fluctuation by attenuating the received light. The PBS 113 separates the received light after attenuation by the slow response VOA 112 into an X-polarized component and a Y-polarized component. The PBS 113 outputs the X-polarized component of the received light to the first hybrid circuit 116A and outputs the Y-polarized component of the received light to the second hybrid circuit 1168. The local oscillation light source 115 is a laser diode (LD) that outputs local oscillation light. The BS 114 separates local oscillation light from the local oscillation light source 115 into an X-polarized component and a Y-polarized component. The BS 114 outputs the local oscillation light of the X-polarized component to the first hybrid circuit 116A and outputs the local oscillation light of the Y-polarized component to the second hybrid circuit 1166.

The first hybrid circuit 116A makes the X-polarized component of the local oscillation light interfere with the X-polarized component of the received light to acquire light signals of the inphase (I) component and the quadrature (Q) component. Note that the I component is an in-phase axis component, and the Q component is an orthogonal axis component. The first hybrid circuit 116A outputs the optical signal of the I component out of the X-polarized component to the first PD 117A. The first hybrid circuit 116A outputs the optical signal of the Q component out of the X-polarized component to the second PD 1176.

The second hybrid circuit 1166 makes the Y-polarized component of the local oscillation light interfere with the Y-polarized component of the received light to acquire light signals of the I component and the Q component. The second hybrid circuit 1168 outputs the optical signal of the I component out of the Y-polarized component to the third PD 117C. The second hybrid circuit 1166 outputs the optical signal of the Q component out of the Y-polarized component to the fourth PD 117D.

FIG. 9 is an explanatory diagram illustrating an example of the related optical receiving device 100 when a transient is generated. The first PD 117A electrically converts the optical signal of the I component of the X-polarized component from the first hybrid circuit 116A. The first TIA 118A gain-adjusts the electric signal of the I component of the X-polarized component from the first PD 117A, and outputs the gain-adjusted electric signal to the DSP 120. The first AGC 119A adjusts the gain of the first TIA 118A based on the output level of the electric signal after the gain-adjusting by the first TIA 118A. The first TIA 118A absorbs fast power fluctuation due to the transient of the electrical signal of the I component of the X-polarized component as illustrated in FIG. 9.

The second PD 117B electrically converts the optical signal of the Q component of the X-polarized component from the first hybrid circuit 116A. The second TIA 118B gain-adjusts the electric signal of the Q component of the X-polarized component from the second PD 117B, and outputs the gain-adjusted electric signal to the DSP 120. The second AGC 119B adjusts the gain of the second TIA 118B based on the output level of the electric signal after the gain-adjusting by the second TIA 118B. The second TIA 118B absorbs fast power fluctuation due to the transient of the electrical signal of the Q component of the X-polarized component.

The third PD 117C electrically converts the optical signal of the I component of the Y-polarized component from the second hybrid circuit 116B. The third TIA 118C gain-adjusts the electric signal of the I component of the Y-polarized component from the third PD 117C, and outputs the gain-adjusted electric signal to the DSP 120. The third AGC 119C adjusts the gain of the third TIA 118C based on the output level of the electric signal after the gain-adjusting by the third TIA 118C. The third TIA 118C absorbs fast power fluctuation due to the transient of the electrical signal of the I component of the Y-polarized component.

The fourth PD 117D electrically converts the optical signal of the Q component of the Y-polarized component from the second hybrid circuit 116B. The fourth TIA 118D gain-adjusts the electric signal of the Q component of the Y-polarized component of the fourth PD 117D, and outputs the gain-adjusted electric signal to the DSP 120. The fourth AGC 119D adjusts the gain of the fourth TIA 118D based on the output level of the electric signal after the gain-adjusting by the fourth TIA 118D. The fourth TIA 118D absorbs fast power fluctuation due to the transient of the electrical signal of the Q component of the Y-polarized component.

The DSP 120 includes first to fourth analog digital convertors (ADCs) 121A to 121D, a signal processing unit 122, and a client interface (IF) 123. The first ADC 121A performs digital conversion on the electric signal of the I component of the X-polarized component after the gain-adjustment by the first TIA 118A, and inputs the data of the I component of the X-polarized component after the digital conversion to the signal processing unit 122. The second ADC 121B performs digital conversion on the electric signal of the Q component of the X-polarized component after the gain-adjustment by the second TIA 118B, and inputs the data of the Q component of the X-polarized component after the digital conversion to the signal processing unit 122.

The third ADC 121C performs digital conversion on the electric signal of the I component of the Y-polarized component after the gain-adjustment by the third TIA 118C, and inputs the data of the I component of the Y-polarized component after the digital conversion to the signal processing unit 122. The fourth ADC 121D performs digital conversion on the electric signal of the Q component of the Y-polarized component after the gain-adjustment by the fourth TIA 118D, and inputs the data of the Q component of the Y-polarized component after the digital conversion to the signal processing unit 122.

The signal processing unit 122 performs signal processing such as distortion correction and error correction on the received data including the data of the I component and the Q component of the X-polarized component and the data of the I component and the Q component of the Y-polarized component. The signal processing unit 122 inputs the received data after the signal processing to the client IF 123. The client IF 123 is an IF that outputs received data to a terminal on the client side.

The FPGA 130 includes a power calculation unit 131 and a VOA control unit 132. The power calculation unit 131 acquires the gain value and the peak indicator (PI) value of the first TIA 118A detected by the first AGC 119A and the gain value and PI value of the second TIA 118B detected by the second AGC 119B. The PI value corresponds to the output voltage of the TIA. Furthermore, the power calculation unit 131 acquires the gain value and the PI value of the third TIA 118C detected by the third AGC 119C and the gain value and PI value of the fourth TIA 118D detected by the fourth AGC 119D.

The power calculation unit 131 calculates the power value of a target channel. The power calculation unit 131 subtracts the average value of the four gain values from the average value of the four PI values taking the reception sensitivity of the PDs into consideration to calculate the current power value of the target channel input to the PDs The VOA control unit 132 calculates the difference between the current power value and the target power value of the target channel, and calculates the attenuation amount (ATT value) of the slow response VOA 112 such that the difference is minimized. Then, the VOA control unit 132 adjusts the ATT value of the slow response VOA 112 based on the calculated ATT value.

In the related optical receiving device 100, the slow response VOA 112 absorbs the slow power fluctuation, and the first to fourth TIAs 118A to 118D can absorb the fast power fluctuation due to the transient.

However, the related optical receiving device 100 is demanded to have a wider optical input power range and a wider power transient resistance. FIG. 10 is an explanatory diagram illustrating an example of the optical input power range and the transient resistance of the related optical receiving device 100. As illustrated in FIG. 10, the optical input power range of the optical receiving device 100 is −22 dBm to +1 dBm (range is 23 dB), and the transient resistance of the optical receiving device 100 is demanded to be able to withstand fast fluctuation of ±7 dBm with respect to the input level.

In the optical receiving device 100, for example, slow power fluctuation due to aging is absorbed by the slow response VOA 112, and the fast power fluctuation due to the transient is absorbed by the gain-adjustment by the first to fourth TIAs 118A to 118D, which causes gain fluctuation of the TIAs.

Japanese Laid-open Patent Publication No. 2010-123698, Japanese Laid-open Patent Publication No. 2016-154297, and International Publication No. WO 2015/004828 are disclosed as related art.

SUMMARY

According to an aspect of the embodiments, an optical apparatus includes: an attenuator configured to attenuate signal light that has been input; a photoelectric convertor configured to convert the signal light attenuated by the attenuator into an electric signal; an amplifier configured to adjust a gain of the electric signal; and a processor configured to: detect a monitor value of a target channel from an output signal of the amplifier, calculate a power value of the target channel from the detected monitor value, calculate a difference value between the power value and a target power value of the target channel, calculate a set attenuation amount by adding a current attenuation amount, which is currently set to the attenuator, to the difference value, control the gain of the amplifier so that the difference value of the target channel is minimized when the set attenuation amount is less than zero, and set the set attenuation amount to the attenuator when the set attenuation amount is zero or more.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the related art, the related optical receiving device 100, fluctuation in the frequency response of the TIAs and fluctuation in the input referred noise (IRN) and the like are generated due to the gain fluctuation of the first to fourth TIAs 118A to 118D. As a result, the signal quality deteriorates due to fluctuation in the frequency response of the TIAs and fluctuation in the input referred noise.

Figure 11:
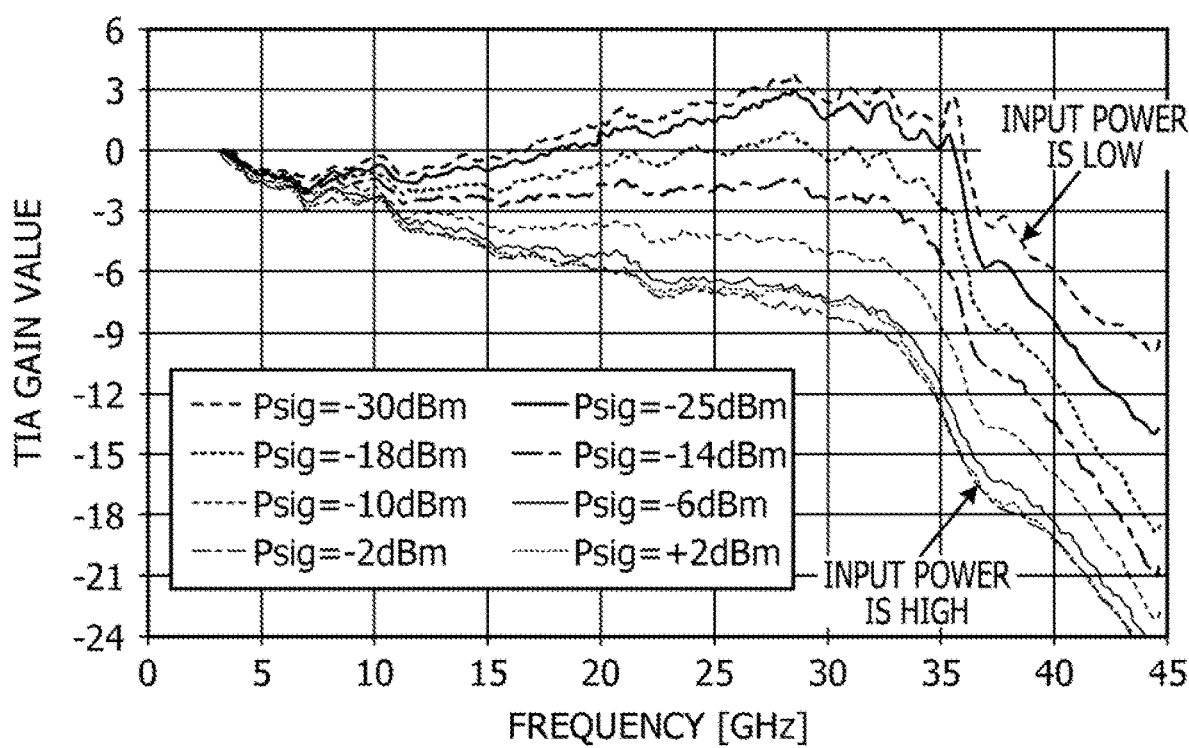
FIG. 11 is an explanatory diagram illustrating an example of the frequency response change of TIAs due to the gain fluctuation of the TIAs in the related optical receiving device.

FIG. 11 is an explanatory diagram illustrating an example of the frequency response change of TIAs due to the gain fluctuation of the TIAs in the related optical receiving device 100. As illustrated in FIG. 11, the TIAs have different frequency responses depending on the input power. Therefore, the DSP 120 has a fixed equalizer, and a setting that compensates for the frequency response at a specific optical input power (=−9 dBm) is applied to the fixed equalizer at the time of shipment. However, when gain fluctuation of the TIAs occurs, the compensation characteristic of the fixed equalizer and the frequency response of the TIAs differ, which leaves distortion that deteriorates the signal quality.

Figure 12:
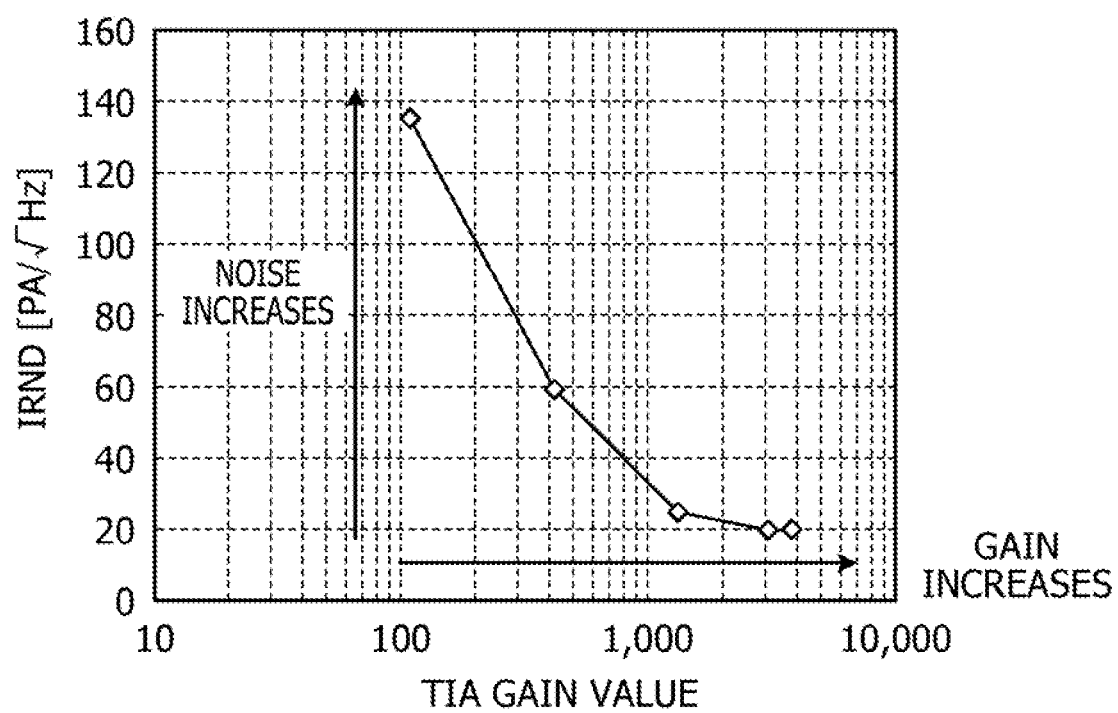
FIG. 12 is an explanatory diagram illustrating an example of change of the input referred noise of TIAs due to the gain fluctuation of the TIAs in the related optical receiving device.

FIG. 12 is an explanatory diagram illustrating an example of change of the input referred noise of TIAs due to the gain fluctuation of the TIAs in the related optical receiving device 100. The TIAs have IRN characteristics as illustrated in FIG. 12, and when the TIAs are operated using the AGCs in case where the input power fluctuates, the gains of the TIAs are automatically adjusted such that the output level of the TIAs becomes constant, and the IRN fluctuates according to the gain fluctuation of the TIAs. As a result, an increase in the IRN deteriorates the signal quality. Thus, it is desirable to use the TIAs in the highest possible gain region where the IRN is small and desirable not to cause gain fluctuation.

Figure 13:
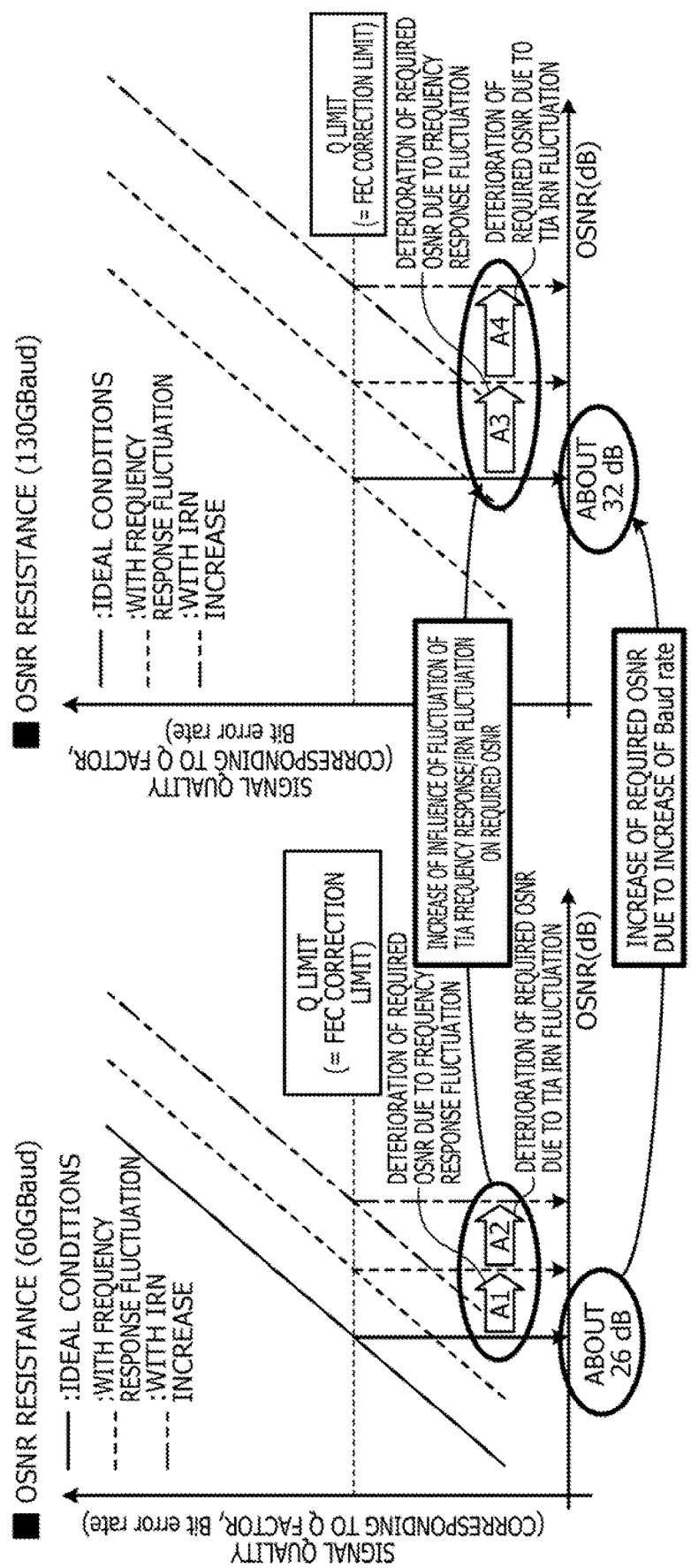
FIG. 13 is an explanatory diagram illustrating a comparative example of OSNR resistance between an optical receiving device of 60 G baud rate and an optical receiving device of 130 G baud rate.

Moreover, when the transmission performance is increased to increase the baud rate to, for example, from 60 G baud rate to 130 G baud rate, the influence of the fluctuation of the frequency response of the TIAs and the fluctuation of the IRN on the signal quality becomes large, deteriorating the transmission performance. As a result, in order to increase the transmission capacity and improve the transmission performance by increasing the baud rate, a mechanism for reducing fluctuation of the gains of the TIAs is desirable, FIG. 13 is an explanatory diagram illustrating a comparative example of OSNR resistance between an optical receiving device of 60 G baud rate and an optical receiving device of 130 G baud rate. The OSNR resistance of the optical receiving device of 60 G baud rate is about 26 dB under ideal conditions, (26 dB+A1) with frequency response fluctuation, and (26 dB+A1+A2) with IRN fluctuation of the TIAs.

On the other hand, the OSNR resistance of the optical receiving device of 130 G baud rate is about 32 dB under ideal conditions, (32 dB+A3) with frequency response fluctuation, and (32 dB+A3+A4) with IRN fluctuation of the TIAs. At this time, the fluctuation amount of the OSNR satisfies the relation, A1<A3 and A2<A4, thus the influence of the OSNR resistance on the frequency response fluctuation and the IRN fluctuation increases as the baud rate increases.

Therefore, in the optical receiving device, the influence of the frequency response fluctuation and the IRN fluctuation on the OSNR resistance increases as the baud rate increases, so that the signal quality deteriorates significantly. Therefore, it is an actual situation in the related optical receiving device that a mechanism for reducing fluctuation of the gains of the TIAs is desired.

On one aspect, it is an object of the present invention to provide an optical receiving device or the like that reduces fluctuation in the gains of the TIAs while absorbing power fluctuation.

Hereinafter, embodiments of an optical receiving device and the like disclosed in the present application will be described in detail with reference to the drawings. Note that the disclosed technology is not limited by each of the embodiments. Furthermore, the embodiments described below may be appropriately combined as long as no contradiction occurs.

First Embodiment

Figure 1:
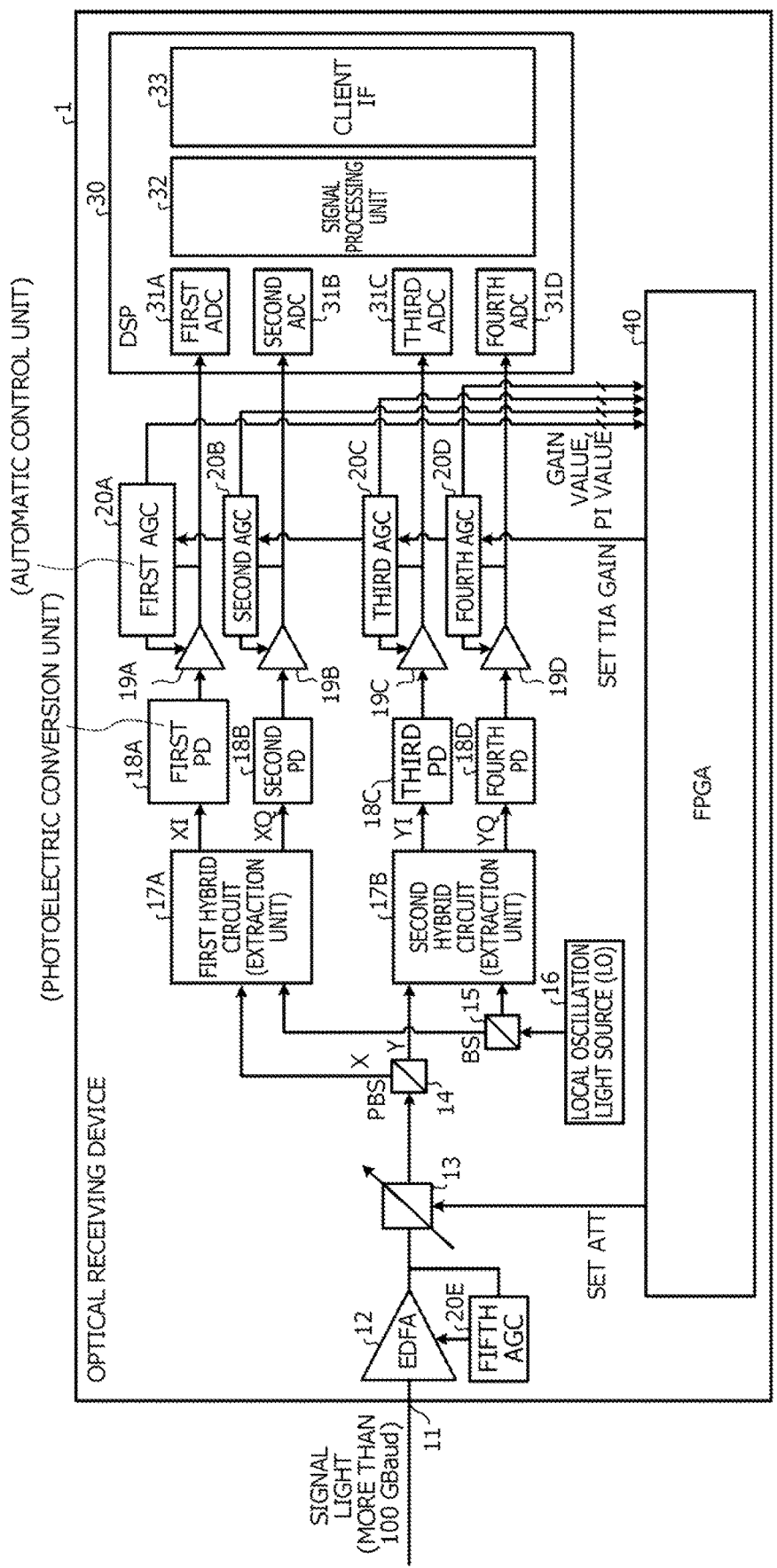
FIG. 1 is an explanatory diagram illustrating an example of an optical receiving device of a first embodiment.

FIG. 1 is an explanatory diagram illustrating an example of an optical receiving device 1 of a first embodiment. The optical receiving device 1 illustrated in FIG. 1 is, for example, a digital coherent receiving device of 130 G baud rate. The optical receiving device 1 includes an input terminal 11, an erbium doped fiber amplifier (EDFA) 12, a fast response variable optical attenuator (VOA) 13, a polarization beam splitter (PBS) 14, a beam splitter (BS) 15, and a local oscillation light source 16. The optical receiving device 1 includes a first hybrid circuit 17A, a second hybrid circuit 17B, first to fourth photo diodes (PDs) 18A to 18D and first to fourth trans impedance amplifiers (TIAs) 19A to 19D.

The optical receiving device 1 includes first to fourth automatic gain controls (AGCs) 20A to 20D, a digital signal processor (DSP) 30 and a field programmable gate array (FPGA) 40.

The input terminal 11 is a port to which received light is input. The EDFA 12 is an input stage amplification unit that amplifies the received light when the received light is input to the fast response VOA 13. The EDFA 12 can widen the input range of the fast response VOA 13 by amplifying the received light. The fast response VOA 13 is an attenuation unit that absorbs power fluctuation by attenuating the received light amplified by the EDFA 12. The PBS 14 separates the received light after attenuation by the fast response VOA 13 into an X-polarized component and a Y-polarized component. The PBS 14 outputs the X-polarized component of the received light to the first hybrid circuit 17A and outputs the Y-polarized component of the received light to the second hybrid circuit 17B. The local oscillation light source 16 is a laser diode (LD) that outputs local oscillation light. The BS 15 separates local oscillation light from the local oscillation light source 16 into an X-polarized component and a Y-polarized component. The BS 15 outputs the X-polarized component of the local oscillation light to the first hybrid circuit 17A and outputs the Y-polarized component of the local oscillation light to the second hybrid circuit 17B.

The first hybrid circuit 17A is an extraction unit that extracts light signals of the I component and the Q component from the received light of the X-polarized component by making the X-polarized component of the local oscillation light interfere with the X-polarized component of the received light. Note that the I component is an in-phase axis component, and the Q component is an orthogonal axis component. The first hybrid circuit 17A outputs the optical signal of the I component out of the X-polarized component of the received light to the first PD 18A. The first hybrid circuit 17A outputs the optical signal of the Q component out of the X-polarized component of the received light to the second PD 18B.

The second hybrid circuit 17B is an extraction unit that extracts light signals of the I component and the Q component from the received light of the Y-polarized component by making the Y-polarized component of the local oscillation light interfere with the Y-polarized component of the received light. The second hybrid circuit 176 outputs the optical signal of the I component out of the Y-polarized component of the received light to the third PD 18C. The second hybrid circuit 176 outputs the optical signal of the Q component out of the Y-polarized component of the received light to the fourth PD 18D.

The first PD 18A is a photoelectric conversion unit that electrically converts the optical signal of the I component of the X-polarized component from the first hybrid circuit 17A. The first TIA 19A is an amplification unit that gain-adjusts the electric signal of the I component of the X-polarized component from the first PD 18A, and outputs the gain-adjusted electric signal to the DSP 30. The first AGC 20A is an automatic adjusting unit that adjusts the gain of the first TIA 19A based on the output level of the electric signal after the gain-adjustment of the first TIA 19A. The first TIA 19A absorbs fast power fluctuation due to the transient of the electrical signal of the I component of the X-polarized component.

The second PD 18B is a photoelectric conversion unit that electrically converts the optical signal of the Q component of the X-polarized component from the first hybrid circuit 17A. The second TIA 19B is an amplification unit that gain-adjusts the electric signal of the Q component of the X-polarized component from the second PD 18B, and outputs the gain-adjusted electric signal to the DSP 30. The second AGC 20B is an automatic adjusting unit that adjusts the gain of the second TIA 19B based on the output level of the electric signal after the gain-adjustment of the second TIA 198. The second TIA 198 absorbs fast power fluctuation due to the transient of the electrical signal of the Q component of the X-polarized component.

The third PD 18C is a photoelectric conversion unit that electrically converts the optical signal of the I component of the Y-polarized component from the second hybrid circuit 17B. The third TIA 19C is an amplification unit that gain-adjusts the electric signal of the I component of the Y-polarized component from the third PD 18C, and outputs the gain-adjusted electric signal to the DSP 30. The third AGC 20C is an automatic adjusting unit that adjusts the gain of the third 11A 19C based on the output level of the electric signal after the gain-adjustment of the third TIA 19C. The third TIA 19C absorbs fast power fluctuation due to the transient of the electrical signal of the I component of the Y-polarized component.

The fourth PD 18D is a photoelectric conversion unit that electrically converts the optical signal of the Q component of the Y-polarized component from the second hybrid circuit 17B. The fourth TIA 19D is an amplification unit that gain-adjusts the electric signal of the Q component of the Y-polarized component from the fourth PD 18D, and outputs the gain-adjusted electric signal to the DSP 30. The fourth AGC 20D is an automatic adjusting unit that adjusts the gain of the fourth TIA 19D based on the output level of the electric signal after the gain-adjustment of the fourth TIA 19D. The fourth TIA 19D absorbs fast power fluctuation due to the transient of the electrical signal of the Q component of the Y-polarized component. The fifth AGC 20E adjusts the gain of the EDFA 12 based on the output level of the received light amplified by the EDFA 12.

The DSP 30 includes first to fourth analog digital convertors (ADCs) 31A to 31D, a signal processing unit 32, and a client interface (IF) 33. The first ADC 31A performs digital conversion on the electric signal of the I component of the X-polarized component after the gain-adjustment by the first TIA 19A, and inputs the data of the I component of the X-polarized component after the digital conversion to the signal processing unit 32. The second ADC 31B performs digital conversion on the electric signal of the Q component of the X-polarized component after the gain-adjustment by the second TIA 198, and inputs the data of the Q component of the X-polarized component after the digital conversion to the signal processing unit 32.

The third ADC 31C performs digital conversion on the electric signal of the I component of the Y-polarized component after the gain-adjustment by the third TIA 19C, and inputs the data of the I component of the Y-polarized component after the digital conversion to the signal processing unit 32. The fourth ADC 3W performs digital conversion on the electric signal of the Q component of the Y-polarized component after the gain-adjustment by the fourth TIA 19D, and inputs the data of the Q component of the Y-polarized component after the digital conversion to the signal processing unit 32.

The signal processing unit 32 is a processing unit that performs signal processing such as distortion correction and error correction on the received data including the data of the I component and the Q component of the X-polarized component and the data of the I component and the Q component of the Y-polarized component. The signal processing unit 32 inputs the received data after the signal processing to the client. IF 33. The client IF 33 is an IF that outputs received data to a terminal on the client side.

Figure 2:
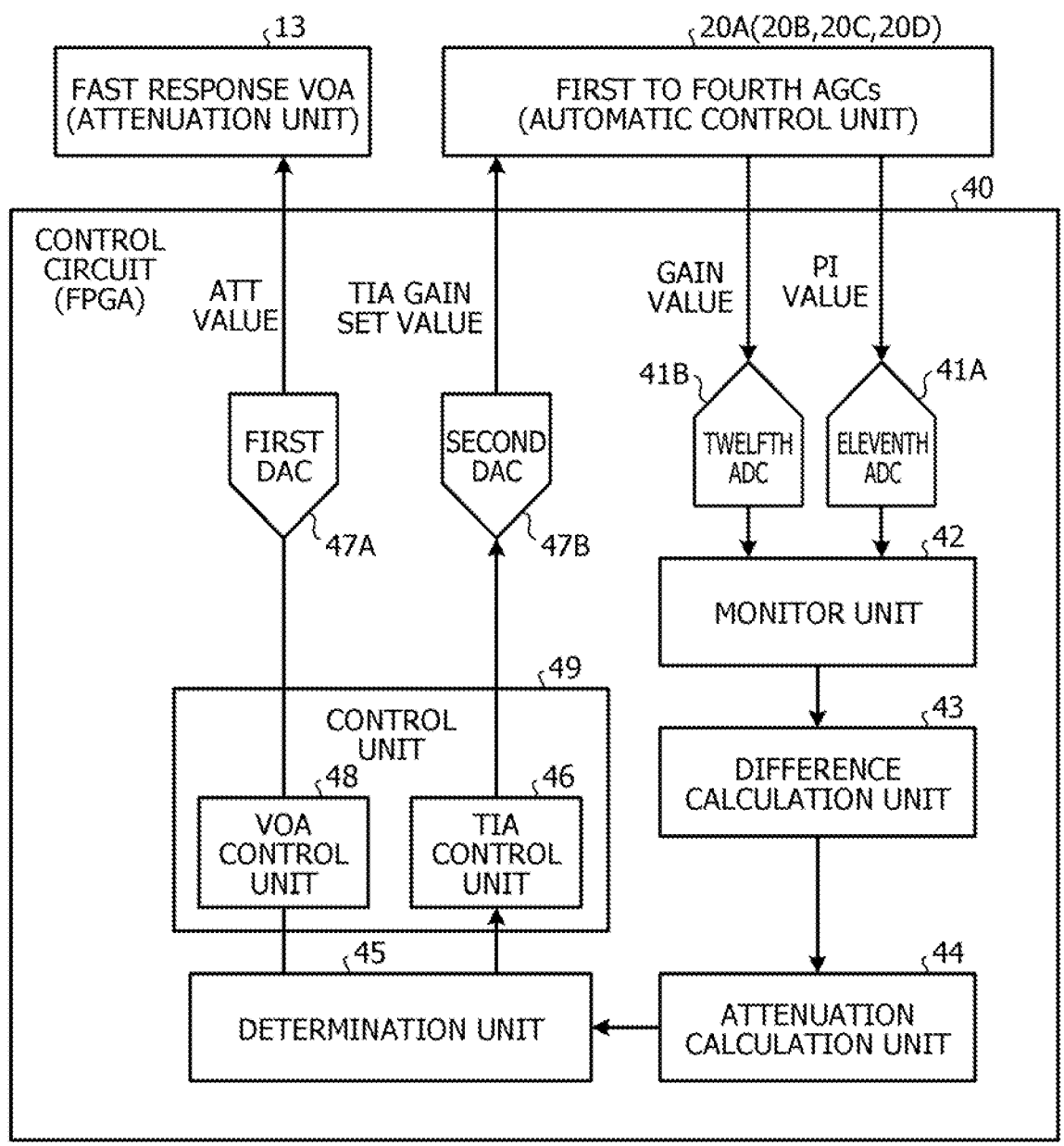
FIG. 2 is an explanatory diagram illustrating an example of a functional configuration of an FPGA of the first embodiment.

The FPGA 40 is a control circuit that controls the entire optical receiving device 1. FIG. 2 is an explanatory diagram illustrating an example of a functional configuration of the FPGA 40 of a first embodiment. The FPGA 40 illustrated in FIG. 2 includes an eleventh ADC 41A, a twelfth ADC 41B, a monitor unit 42, a difference calculation unit 43, an attenuation calculation unit 44, a control unit 49, a first DAC 47A, and a second DAC 47B.

The eleventh ADC 41A performs digital conversion on four peak indicator (PI) values of the target channel being the electrical amplitude values of the electric signals of the first to fourth TIAs 19A to 19D that are acquired from the first to fourth AGCs 20A to 20D. Then, the eleventh ADC 41A inputs the data of the four PI values of the output signals of the first to fourth TIAs 19A to 19D to the monitor unit 42. Note that the four PI values of the target channel include the PI value of the first TIA 19A, the PI value of the second TIA 19B, the PI value of the third TIA 19C, and the PI value of the fourth TIA 19D.

The twelfth ADC 41B performs digital conversion on the four gain values of the target channel of the first to fourth TIAs 19A to 19D that are acquired from the first to fourth AGCs 20A to 20D. and inputs the four gain values of the first to fourth TIAs 19A to 19D to the monitor unit 42. Note that the four gain values of the target channel include the gain value of the first TIA 19A, the gain value of the second TIA 19B, the gain value of the third TIA 19C, and the gain value of the fourth TIA 19D.

The monitor unit 42 detects the four PI values and the four gain values of the target channel of the first to fourth TIAs 19A to 19D. The difference calculation unit 43 calculates the current power value of the target channel based on the PI values and the gain values, of target channel of the first to fourth TIAs 19A to 19D. Note that the current power value of the target channel is an optical power value of the target channel for one wavelength received by the first to fourth PDs 18A to 18D. The difference calculation unit 43 subtracts the average value of the four gain values of the first to fourth TIAs 19A to 19D from the average value of the four PI values of the first to fourth TIAs 19A to 19D taking the reception sensitivity of the PDs into consideration to calculate the current power value of the target channel input to the PDs. Moreover, the difference calculation unit 43 calculates, as the first difference value, the difference between the current power value of the target channel and the target power value of the target channel. For example, when the current power value is +5 dBm and the target power value is 0 dBm, the first difference value is (5 dBm−0 dBm), and thus is 5 dB.

The attenuation calculation unit 44 calculates a set ATT value (set attenuation) to be set in the fast response VOA 13 by adding the current AU value and the first difference value. For example, when the current ATT value (attenuation amount) is 1 dB and the first difference value is 5 dB, the set ATT value is (1 dB+5 dB), and thus is 6 dB. Therefore, the fast response VOA 13 changes the power value of the target channel to 0 dBm by changing the current ATT value from 1 dB to 6 dB.

The control unit 49 adjusts the gains of the first to fourth TIAs 19A to 19D such that the first difference value of the target channel is minimized in a case where the set ATT value is less than zero. The control unit 49 controls the fast response VOA 13 such that the fast response VOA 13 sets the set ATT value in a case where the set ATT value is zero or more.

The control unit 49 includes a determination unit 45, a TIA control unit 46, and a VOA control unit 48. The determination unit 45 determines whether the set ATT value calculated by the attenuation calculation unit 44 is zero (0 dB) or more. When the set ATT value is 0 dB or more, the VOA control unit 48 sets the set ATT value to the fast response VOA 13. That is, when the set ATT value is 0 dB or more, the fast response VOA 13 absorbs the power fluctuation of the target channel without using the gain-adjustment of the first to fourth TIAs 19A to 19D.

The VOA control unit 48 inputs the set ATT value to the first DAC 47A. The first DAC 47A performs analog conversion on the set Au value, and sets the set ATT value after the analog conversion to the fast response VOA 13. As a result, the fast response VOA 13 absorbs the fluctuating power of the received light by attenuating, according to the set ATT value, the received light input from the EDFA 12.

Furthermore, when the set ATT value is less than 0 dB, the TIA control unit 46 absorbs power fluctuation of the target channel by gain-adjustment of the first to fourth TIAs 19A to 19D while maintaining the MT value currently set to the fast response VOA 13.

The TIA control unit 46 calculates the TIA gain set value for the first difference value, which is the difference between the current power value and the target power value of the target channel. For example, in a case where the current power value is −4 dBm, the target power value is 0 dBm, and the current TIA gain set value is 0 dB, −(current power value−target power value)=−(−4 dBm−(0 dBm))=4 dB is added to the current TIA gain value to calculate the TIA gain set value.

The TIA control unit 46 inputs the TIA gain set value that has increased by the first difference value to the second DAC 47B. The second DAC 47B performs analog conversion on the TIA gain set value calculated by the TIA control unit 46, and inputs the TIA gain set value after the analog conversion to the first to fourth AGCs 20A to 20D. The first to fourth AGCs 20A to 20D adjusts the gains of the first to fourth TIAs 19A to 19D based on the TIA gain set value calculated by the TIA control unit 46 such that the first difference value of the target channel is minimized. As a result, the first TIA 19A adjusts the gain of the electric signal of the I component of the X-polarized component of the target channel according to the TIA gain set value. The second TIA 19B adjusts the gain of the electric signal of the Q component of the X-polarized component of the target channel according to the TIA gain set value. The third TIA 19C adjusts the gain of the electric signal of the I component of the Y-polarized component of the target channel according to the TIA gain set value. Moreover, the fourth TIA 19D adjusts the gain of the electric signal of the Q component of the Y-polarized component of the target channel according to the TIA gain set value. As a result, the power fluctuation of the target channel can be absorbed.

Figure 3:
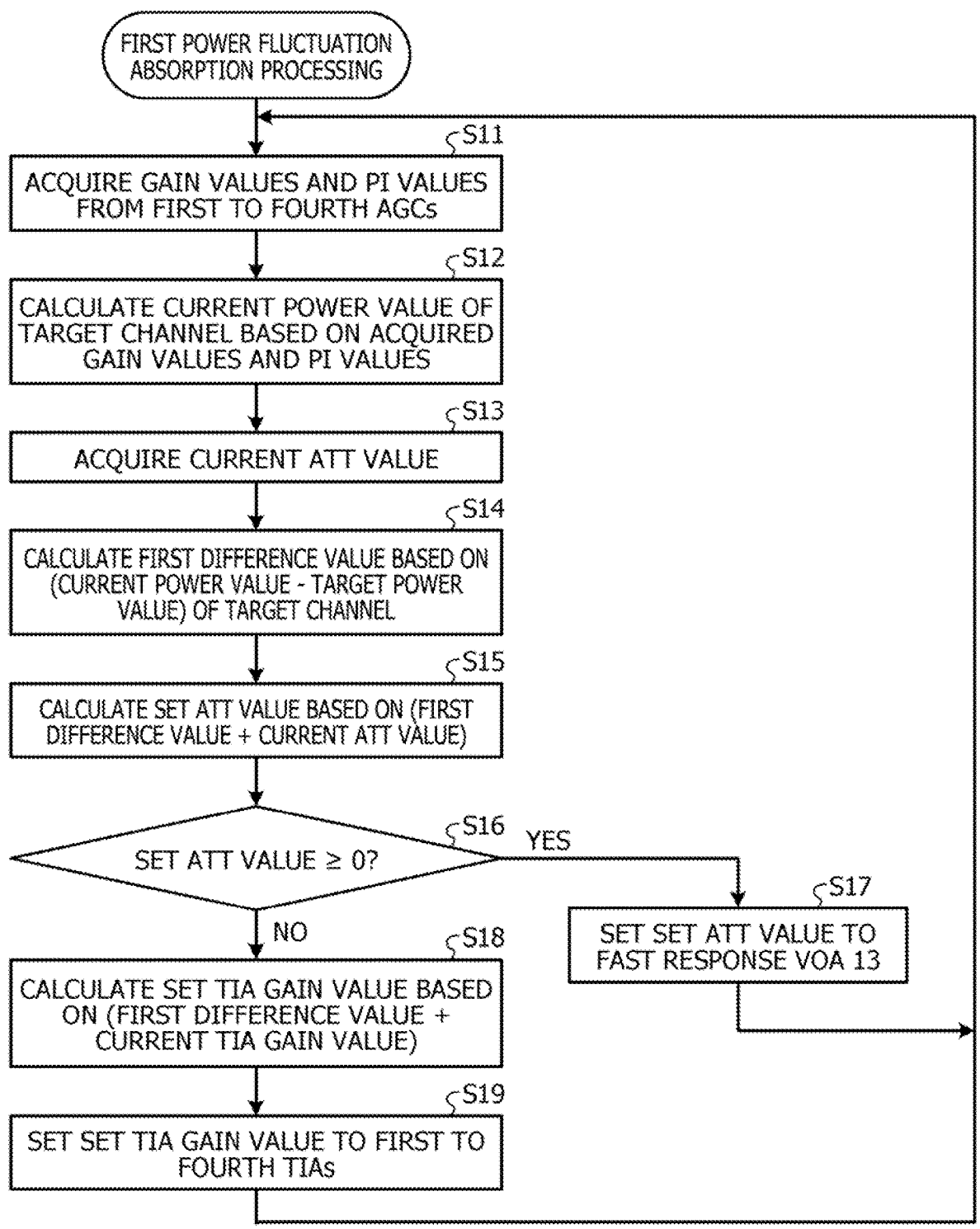
FIG. 3 is a flowchart illustrating an example of processing operations of the FPGA related to first power fluctuation absorption processing.

FIG. 3 is a flowchart illustrating an example of processing operations of the FPGA 40 related to first power fluctuation absorption processing. In FIG. 3, the monitor unit 42 in the FPGA 40 acquires the four gain values and the four PI values of the target channel of the first to fourth TIAs 19A to 19D from the first to fourth AGCs 20A to 20D (step S11). The difference calculation unit 43 in the FPGA 40 calculates the current power value of the target channel based on the four gain values and the four PI values of the target channel (step S12).

The difference calculation unit 43 acquires the current ATT value currently set to the fast response VOA 13 (step S13). The difference calculation unit 43 calculates the first difference value based on (current power value −target power value) of the target channel (step S14).

The attenuation calculation unit 44 in the FPGA 40 calculates the set ATT value based on (first difference value+current ATT value) (step S15). The determination unit 45 in the FPGA 40 determines whether the set ATT value is 0 dB or more (step S16). When the set ATT value is 0 dB or more (Yes in step S16), the VOA control unit 48 in the control unit 49 in the FPGA 40 sets the set ATT value to the fast response VOA 13 (step S17), and then the processing proceeds to step S11 to acquire four gain values and four PI values of the current target channel. As a result, the optical receiving device 1 can absorb the power fluctuation by the attenuation control of the fast response VOA 13 without performing the gain fluctuation of the first to fourth TIAs 19A to 19D, so that the deterioration of the signal quality due to the frequency response fluctuation and the IRN fluctuation can be reduced.

When the set ATT value is not 0 dB or more, that is, less than 0 dB (No in step S16), the TIA control unit 46 in the control unit 49 calculates the TIA gain set value based on (−(first difference value)+current TIA gain value) (step S18).

The TIA control unit 46 sets the calculated TIA gain set value to the first to fourth TIAs 19A to 19D (step S19). Moreover, the TIA control unit 46 proceeds to step S11 to acquire the four gain values and the four PI values of the current target channel. As a result, the optical receiving device 1 sets the gain only when the dead loss is caused, in which the fast response VOA 13 cannot attenuate the signal, that is, the fast response VOA 13 cannot function as an attenuator, so that the amount of the TIA gain fluctuation can be reduced.

Figure 4:
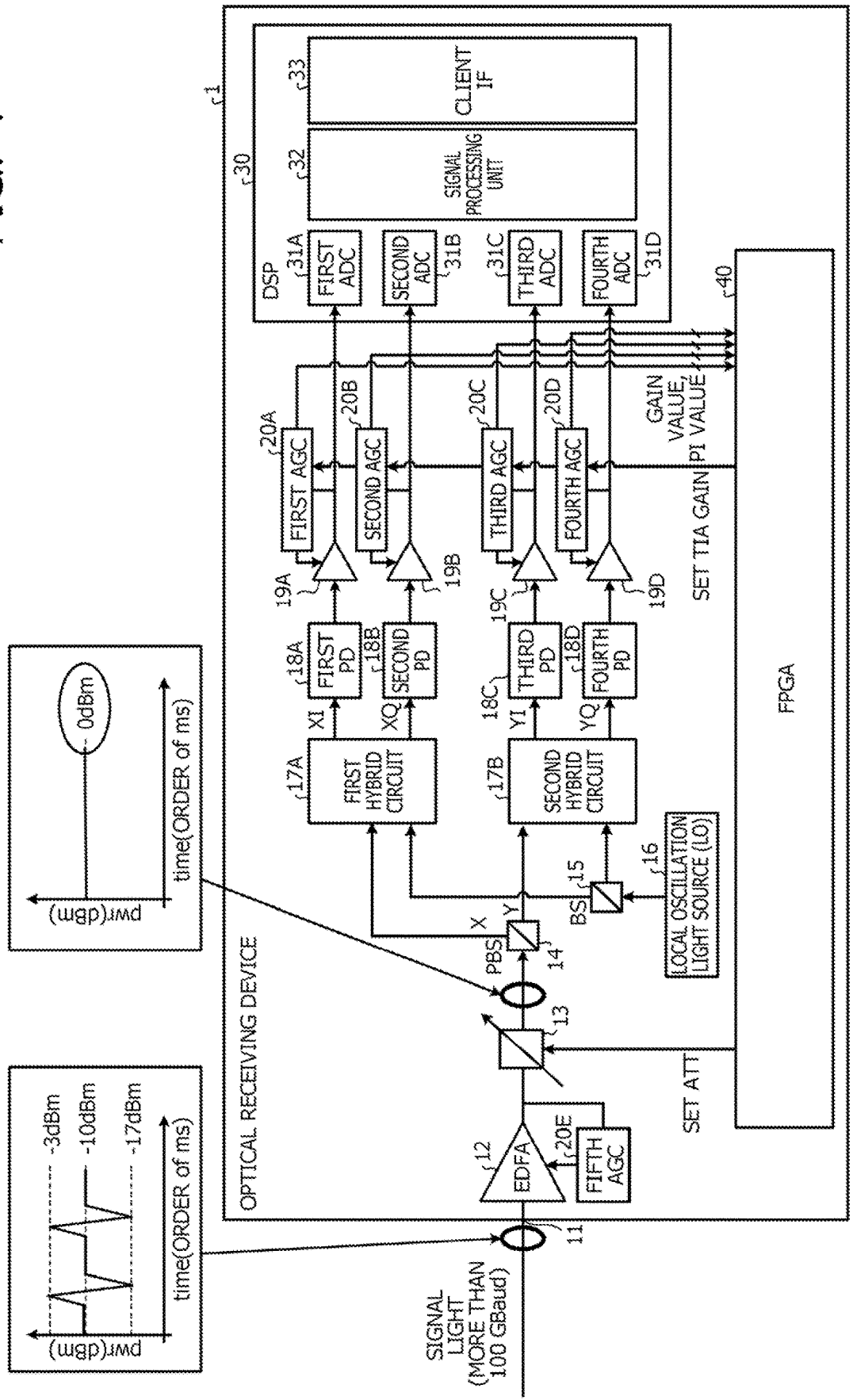
FIG. 4 is an explanatory diagram illustrating an example of processing operations related to power fluctuation absorption of first to fourth TIAs.

FIG. 4 is an explanatory diagram illustrating an example of processing operations related to power fluctuation absorption of the first to fourth TIAs 19A to 19D. Even if fast power fluctuation occurs in the received light due to the transient, when the set ATT value is 0 dB or more, the optical receiving device 1 sets the ATT value of the fast response VOA 13 such that the power value of the received light of the target channel becomes 0 dBm. As a result, the fast response VOA 13 can absorb high speed power fluctuation due to the transient until the fast response VOA 13 becomes the dead loss state.

Figure 5:
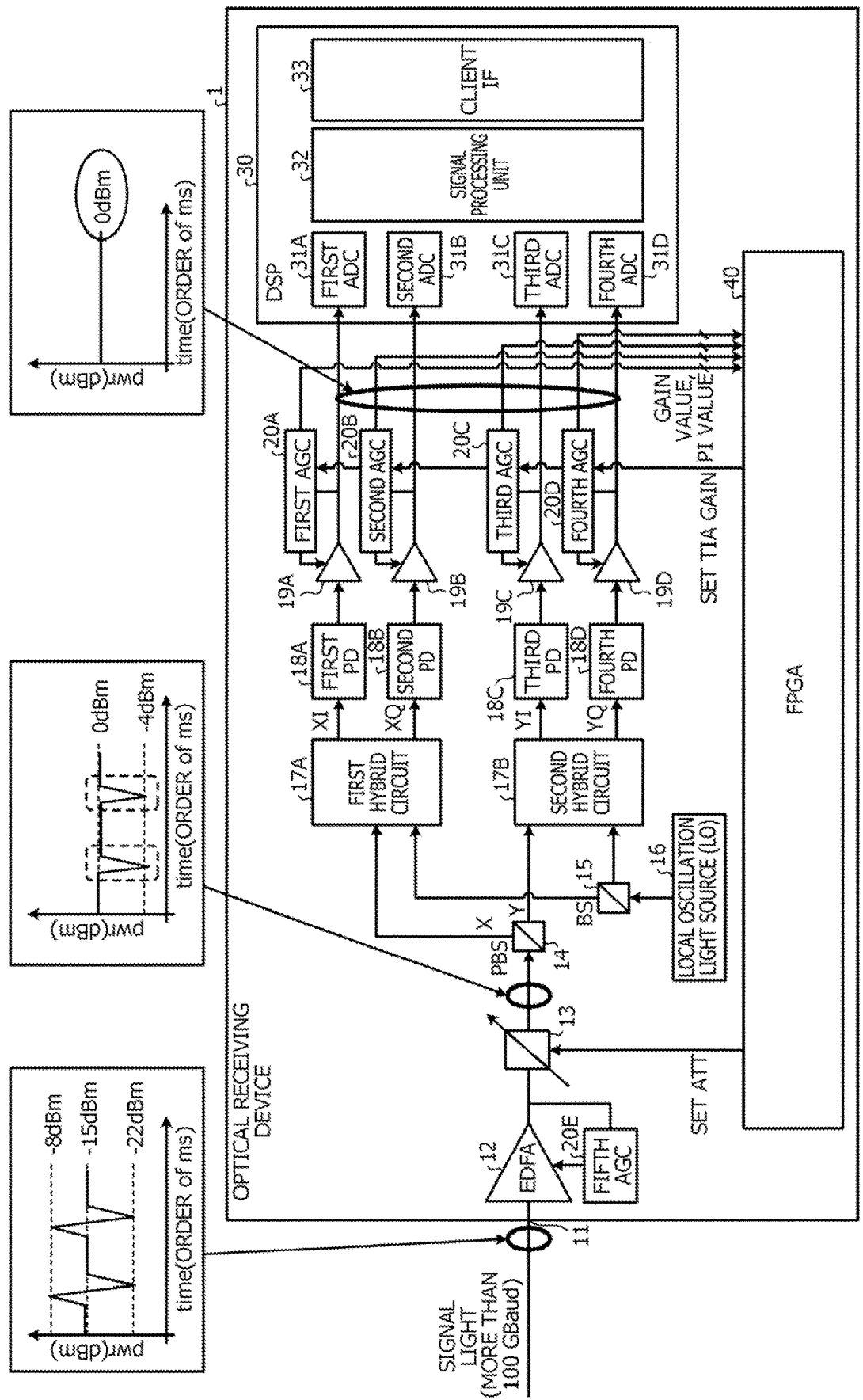
FIG. 5 is an explanatory diagram illustrating an example of processing operations related to power fluctuation absorption of the first to fourth TIAs under the dead loss condition of the fast response VOA.

FIG. 5 is an explanatory diagram illustrating an example of processing operations related to power fluctuation absorption of the first to fourth TIAs 19A to 19D under the dead loss condition of the fast response VOA 13. When the fast response VOA 13 is in the dead loss state and the fast power fluctuation occurs in the received light due to the transient, the set ATT value becomes less than 0 dB since the optical receiving device 1 is in the dead loss state. The fast response VOA 13 maintains the current ATT value.

Then, the optical receiving device 1 calculates the first difference value based on (current power value−target power value) of the target channel, and calculates the set value of the TIA gain based on (first difference value+current ATT value), When the optical receiving device 1 sets the TIA gain set value to the first to fourth TIAs 19A to 19D, the power fluctuation of each of electric signals of the first to fourth TIAs 19A to 19D becomes 0 dBm. As a result, the first to fourth TIAs 19A to 19D absorb fast power fluctuation.

The optical receiving device 1 of the first embodiment adjusts the gains of the first to fourth TIAs 19A to 19D such that the first difference value of the target channel is minimized in a case where the set ATT value is less than zero. As a result, the power fluctuation can be absorbed by the gain-adjustment of the first to fourth TIA 19A to 19D only when the fast response VOA 13 is in the dead loss state. Therefore, the gain fluctuation of the TIA is reduced to the minimum, and thus the deterioration of the signal quality due to the frequency response fluctuation of the TIA and the IRN fluctuation can be reduced.

when the set ATT value is zero or more, the optical receiving device 1 sets the set ATT value to the fast response VOA 13. As a result, power fluctuation can be absorbed without using TIA gain-adjustment until attenuated by the fast response VOA 13. Therefore, by reducing the gain fluctuation of the TIA to the minimum, the deterioration of the signal quality due to the frequency response fluctuation of the TIA and the IRN fluctuation can be reduced.

The fast response VOA 13 sets the ATT value such that the signal light has a reception sensitivity equal to or more those of the first to fourth PDs 18A to 18O when converting the signal light into electric signals. As a result, power fluctuation can be absorbed.

The optical receiving device 1 acquires the four gain values and the four PI values of the I component and the Q component of the X-polarized component and the Y-polarized component of the target channel, and calculates the power value of the electric signals of the first to fourth PDs 18A to 18O based on the average value of the four gain values and the average value of the four PI values. As a result, the optical receiving device 1 can calculate the power value of the first to fourth PDs 18A to 18O based on the gain values and PI values of the first to fourth TIAs 19A to 19D.

Note that the monitor unit 42 in the optical receiving device 1 of the first embodiment acquires the four gain values and the four PI values of target channel of the first to fourth TIAs 19A to 19D from the first to fourth AGCs 20A to 20D. A case where the difference calculation unit 43 then calculates the current power value of the first to fourth PDs 18A to 18O based on the four gain values and the four PI values has been exemplified. However, the current power value may be calculated based on the four PT values of the target channel as the current power value of the target channel, and the embodiment will be described below as a second embodiment. Note that the same reference signs are provided to the same components as those of the optical receiving device 1 of the first embodiment and the description of the same components and operations is not provided.

Second Embodiment

Figure 6:
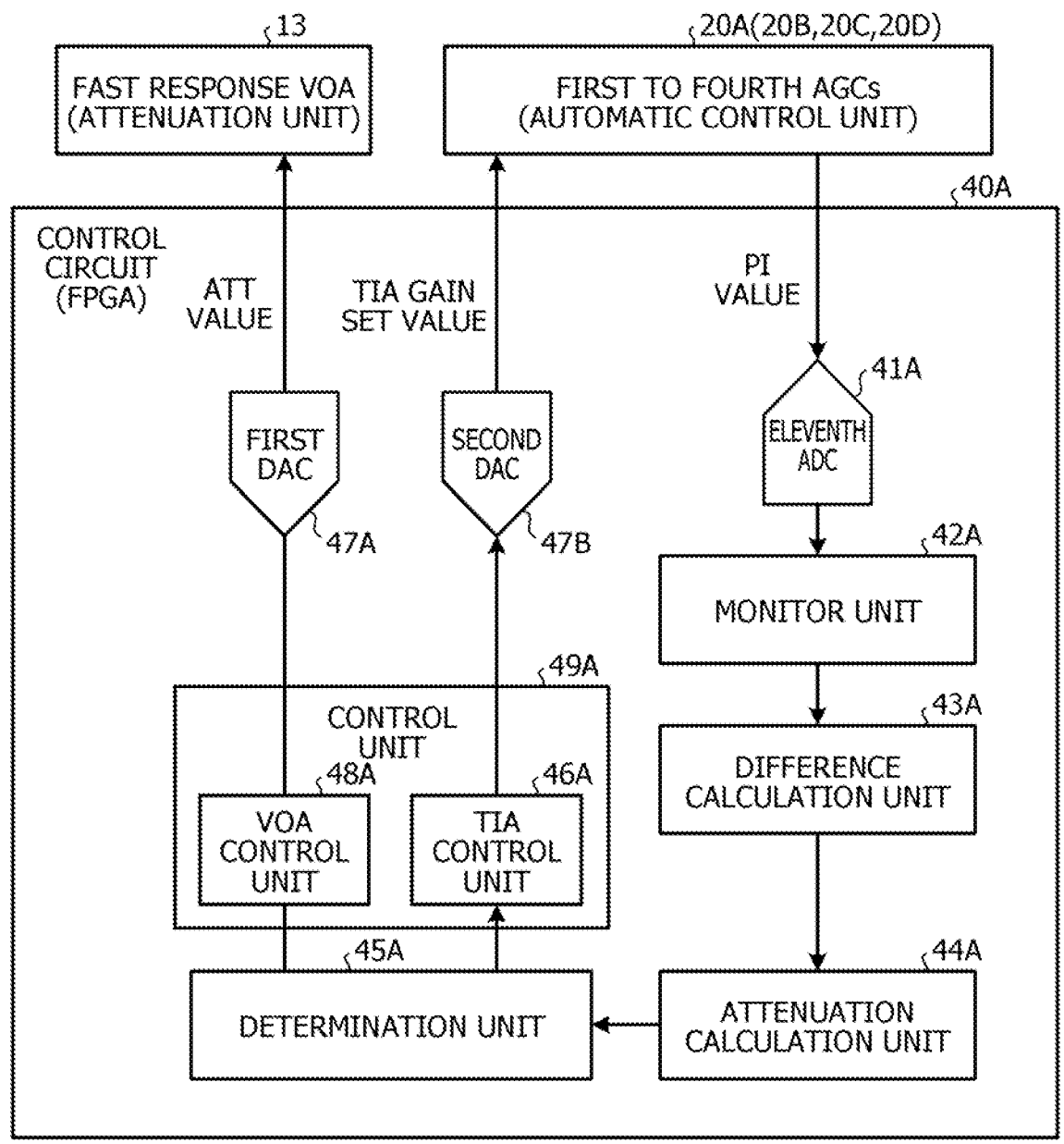
FIG. 6 is an explanatory diagram illustrating an example of a functional configuration of an FPGA of a second embodiment.

FIG. 6 is an explanatory diagram illustrating an example of a functional configuration of an FPGA 40A of a second embodiment. The difference between the FPGA 40A illustrated in FIG. 6 and FPGA 40 is that PI values are acquired out of the gain values and the PI values of target channel of the first to fourth TIAs 19A to 19D, and the current power value is calculated from the PI values. The FPGA 40A illustrated in FIG. 6 includes an eleventh ADC 41A, a monitor unit 42A, a difference calculation unit 43A, an attenuation calculation unit 44A, a control unit 49A, a first DAC 47A, and a second DAC 476.

The eleventh ADC 41A performs digital conversion on the four PIs that are amplitudes of the electric signals of the first to fourth TIA 19A to 19D acquired from the first to fourth AGCs 20A to 200 and inputs the four PI values of the output signals of the first to fourth TIAs 19A to 19D to the monitor unit 42A. Note that the four PI values in the target channel include the PI value of the first TIA 19A, the PI value of the second TIA 196, the PI value of the third TIA 19C, and the PI value of the fourth TIA 19D.

The monitor unit 42A acquires the four PI values of the target channel of the first to fourth TIAs 19A to 19D. The difference calculation unit 43A calculates the current power value of the target channel based on the PI values of the target channel of the first to fourth TIAs 19A to 19D. The current power value of the target channel here is the power value at the TIA output. Note that the current power value of the target channel is the power average value of the PI values of the first to fourth TIAs 19A to 19D.

The difference calculation unit 43A calculates, as the current power value of the target channel, the average value of the four PI values of the target channel of the first to fourth TIAs 19A to 19D. Moreover, the difference calculation unit 43A calculates, as the second difference value, the difference between the current power value of the target channel and the target power value of the target channel.

The attenuation calculation unit 44A calculates a set ATT value to be set to the fast response VOA 13 by adding the current ATT' value and the second difference value. The control unit 49A includes a determination unit 45A, a VOA control unit 48, and a TIA control unit 46A. The determination unit 45A determines whether the set ATT value calculated by the attenuation calculation unit 44A is 0 dB or more. When the set ATT value is 0 dB or more, the VOA control unit 48A sets the set ATT value to the fast response VOA 13. That is, when the set ATT value is 0 dB or more, the fast response VOA 13 absorbs the power fluctuation of the target channel without using the gain-adjustment of the first to fourth TIAs 19A to 19D.

The VOA control unit 48A inputs the set ATT value to the first DAC 47A. The first DAC 47A performs analog conversion on the set ATT value, and sets the set ATT value after the analog conversion to the fast response VOA 13. As a result, the fast response VOA 13 absorbs the power fluctuation of the target channel by attenuating, according to the set ATT value, the received light input from the EDFA 12.

Furthermore, when the set ATT value is less than 0 dB, the TIA control unit 46A maintains the ATT value currently set to the fast response VOA 13. That is, when the set ATT value is less than 0 dB is a case where the fast response VOA 13 is in the dead loss state, in which the fast response VOA 13 cannot perform attenuation. Therefore, while maintaining the current ATT value of the fast response VOA 13, the power fluctuation of the target channel is absorbed by adjusting the gains of the first to fourth TIAs 19A to 19D.

The TIA control unit 46A calculates the TIA gain set value for the second difference value, which is the difference between the current power value of the target channel and the target power value. The TIA control unit 46A calculates the TIA gain set value by adding (current power value−target power value) to the current TIA gain value. The TIA control unit 46A inputs the calculated TIA gain set value to the second DAC 47B. The second DAC 47B performs analog conversion on the calculated TIA gain set value, and inputs the TIA gain set value after the analog conversion to the first to fourth AGCs 20A to 20D. The first to fourth AGCs 20A to 20D adjusts the gains of the first to fourth TIAs 19A to 19D based on the TIA gain set value calculated by the TIA control unit 46A. As a result, the first TIA 19A adjusts the gain of the electric signal of the I component of the X-polarized component of the target channel according to the TIA gain set value. The second TIA 19B adjusts the gain of the electric signal of the Q component of the X-polarized component of the target channel according to the TIA gain set value. The third TIA 19C adjusts the gain of the electric signal of the I component of the Y-polarized component of the target channel according to the TIA gain set value. Moreover, the fourth TIA 19D adjusts the gain of the electric signal of the Q component of the Y-polarized component of the target channel according to the TIA gain set value. As a result, when the fast response VOA 13 is in a dead loss state, the power fluctuation of the target channel can be absorbed by the first to fourth TIAs 19A to 19D. That is, by reducing opportunities of gain fluctuation of the TIA, the deterioration of the signal quality due to the frequency response fluctuation and the IRN fluctuation can be reduced.

Figure 7:
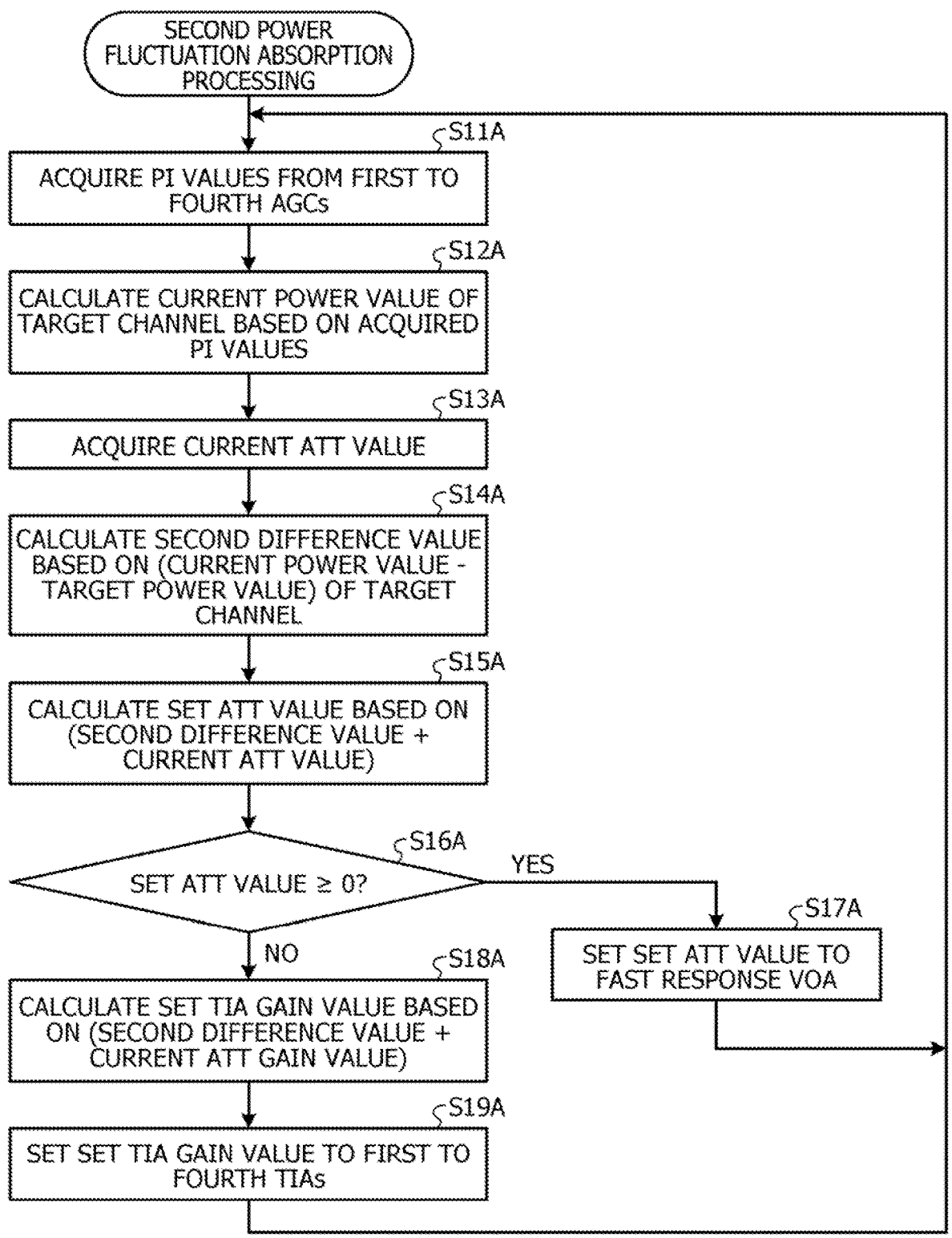
FIG. 7 is a flowchart illustrating an example of processing operations of the FPGA related to second power fluctuation absorption processing.
Figure 8:
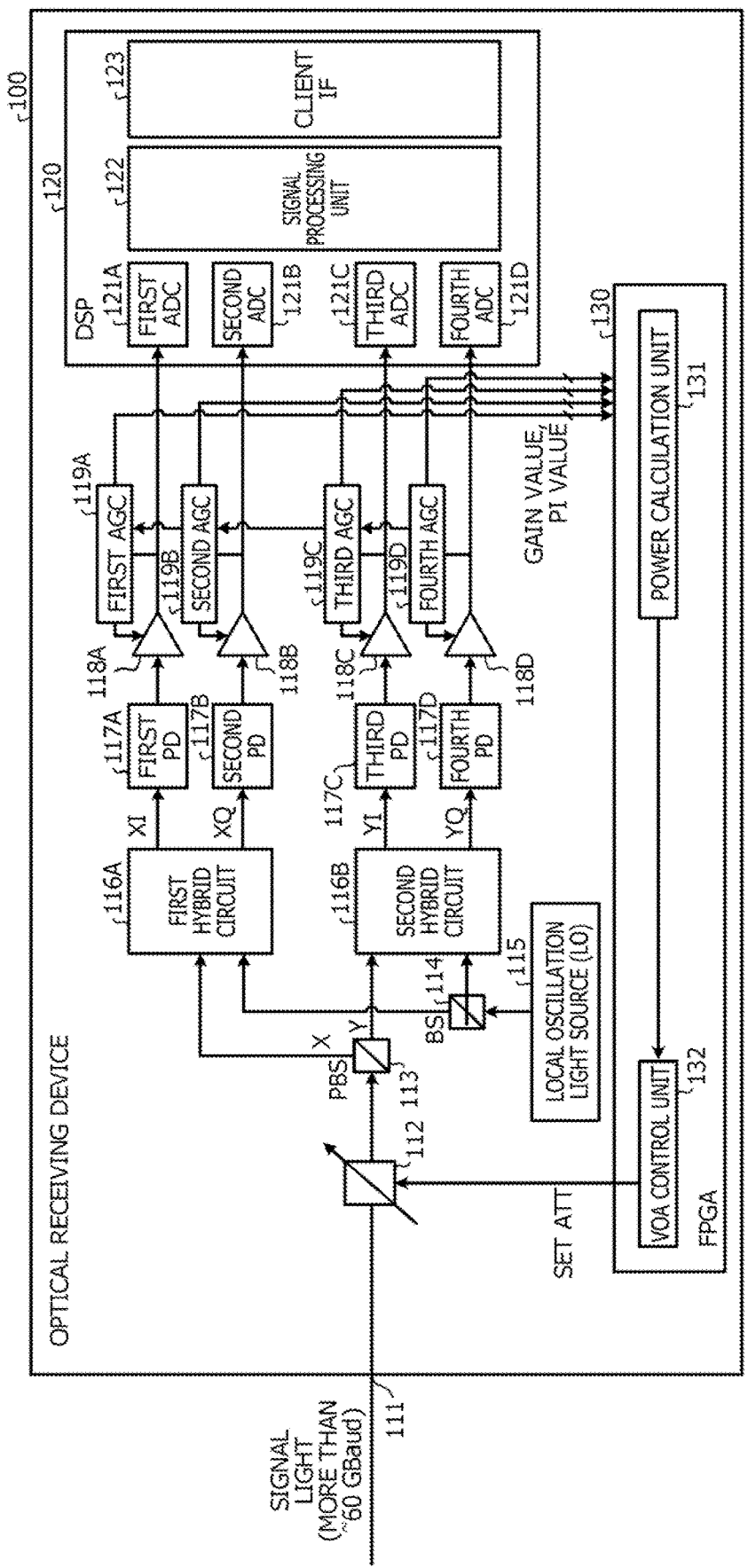
FIG. 8 is an explanatory diagram illustrating an example of a related optical receiving device.
Figure 9:
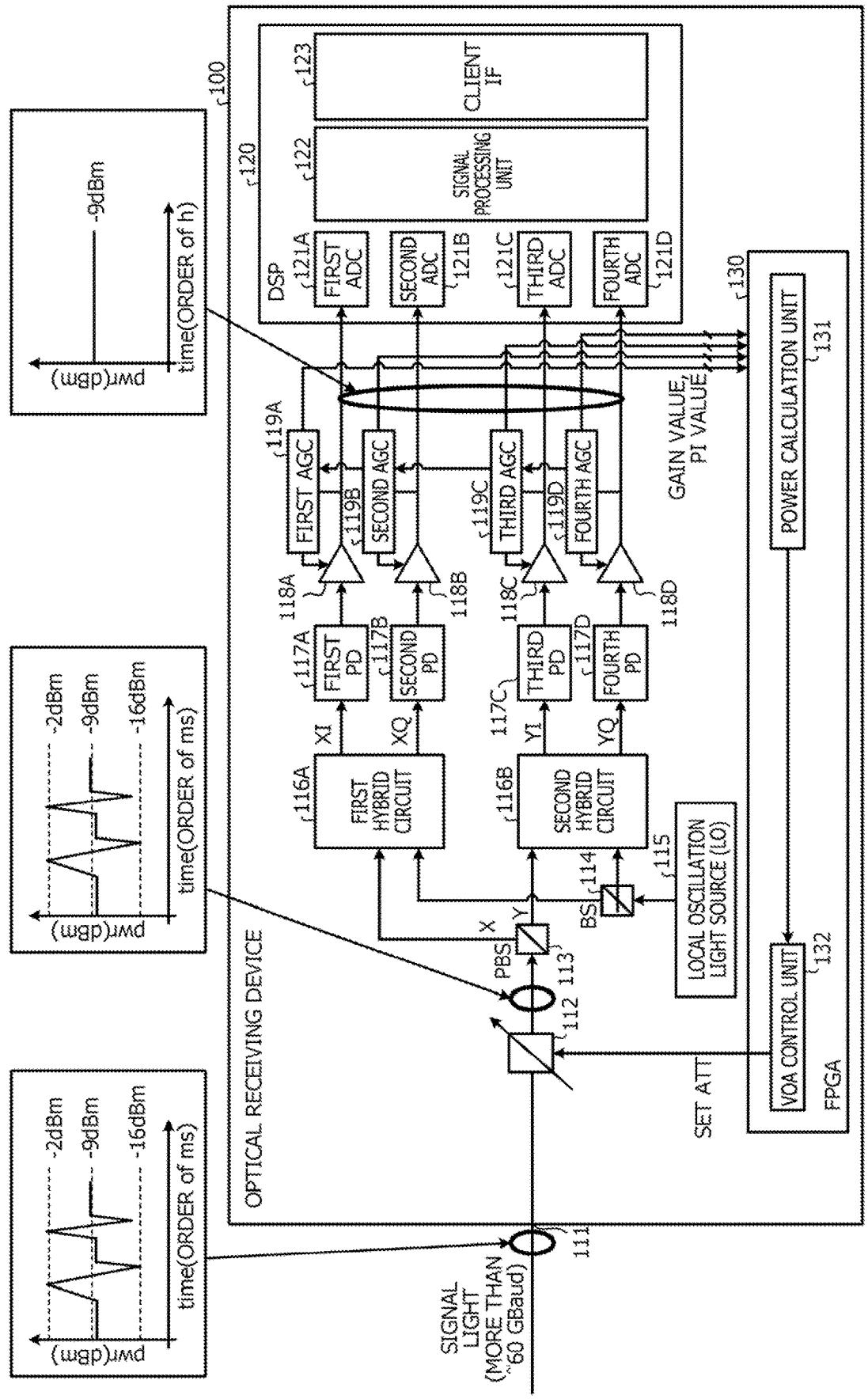
FIG. 9 is an explanatory diagram illustrating an example of the related optical receiving device when a transient is generated.
Figure 10:
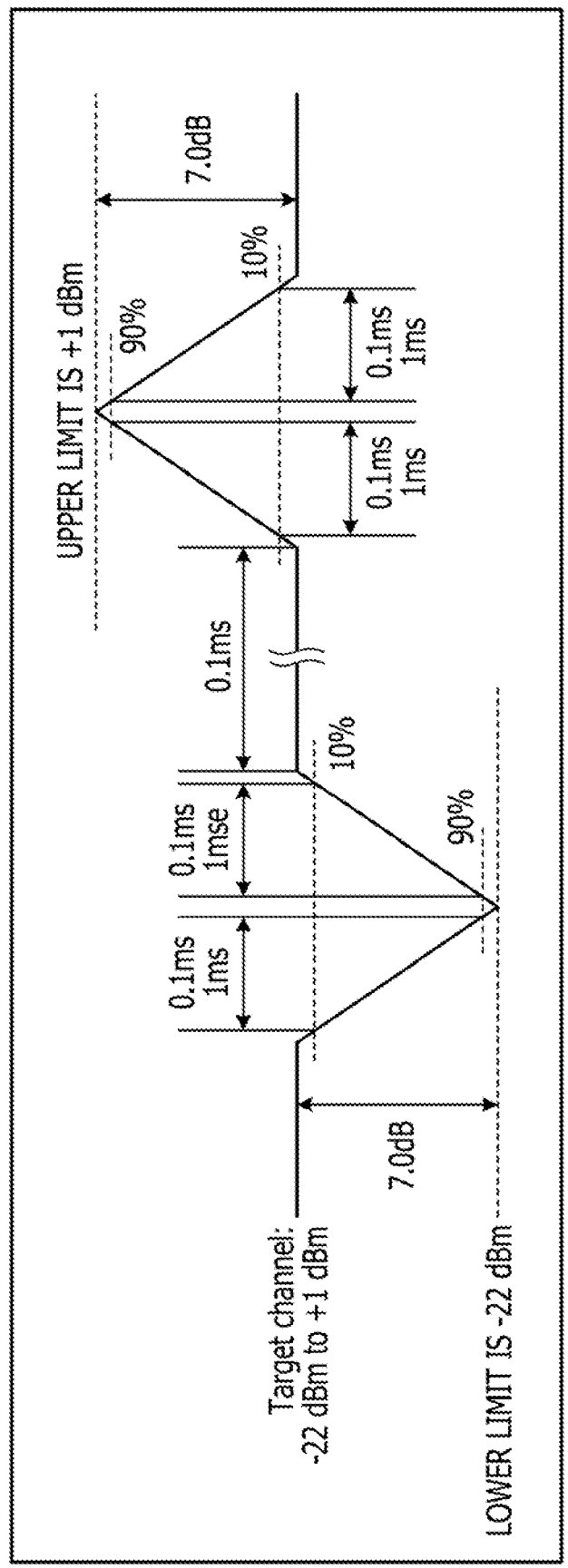
FIG. 10 is an explanatory diagram illustrating an example of the optical input power range and the transient resistance of the related optical receiving device.

FIG. 7 is a flowchart illustrating an example of processing operations of the FPGA 40A related to second power fluctuation absorption processing. In FIG. 7, the monitor unit 42A in the FPGA 40A acquires the four PI values of the target channel of the first to fourth TIAs 19A to 19D from the first to fourth AGCs 20A to 20D (step S11A). The difference calculation unit 43A in the FPGA 40A calculates the current power value of the target channel based on the four PI values of the target channel (step S12A).

The difference calculation unit 43A acquires the current ATT value currently set to the fast response VOA 13 (step S13A). The difference calculation unit 43A calculates the second difference value based on (current power value−target power value) of the target channel (step S14A).

The attenuation calculation unit 44A in the FPGA 40A calculates the set ATT value based on (second difference value+current ATT value) (step S15A). The determination unit 45A in the FPGA 40A determines whether the set ATT value is 0 dB or more (step S16A). When the set ATT value is 0 dB or more (Yes in step S16A), the VOA control unit 48A in the control unit 49A in the FPGA 40A sets the set ATT value to the fast response VOA 13 (step S17A), and then the processing proceeds to step S11A to acquire four PI values of the current target channel. As a result, the optical receiving device 1 can absorb the power fluctuation by the attenuation control of the fast response VOA 13 without performing the gain fluctuation of the first to fourth TIAs 19A to 19D, so that the deterioration of the signal quality due to the frequency response fluctuation and the IRN fluctuation can be reduced.

When the set ATT value is not 0 dB or more, that is, less than 0 dB (No in step S16A), the TIA control unit 46A in the control unit 49A calculates the TIA gain set value based on (first difference value+current ATT value) (step S18A).

The TIA control unit 46A sets the calculated TIA gain set value to the first to fourth TIAs 19A to 19D (step S19A). Moreover, the TIA control unit 46A proceeds to step S11A to acquire the four PI values of the current target channel. As a result, the optical receiving device 1 sets the TIA gain only when the fast response VOA 13 is in the dead loss state, in which the fast response VOA 13 cannot perform attenuation, so that the amount of the TIA gain fluctuation can be reduced.

Even if slow power fluctuation occurs in the received light at the input terminal 11 due to the aging transient, when the set ATT value is 0 dB or more, the optical receiving device 1 sets the ATT value of the fast response VOA 13 such that the power value of the received light of the target channel becomes 0 dBm. As a result, the fast response VOA 13 can absorb slow power fluctuation due to aging deterioration.

Even if fast power fluctuation occurs in the received light due to the transient, when the set ATT value is 0 dB or more, the optical receiving device 1 sets the ATT value of the fast response VOA 13 such that the power value of the received light of the target channel becomes 0 dBm. As a result, the fast response VOA 13 can absorb high speed power fluctuation due to the transient until the fast response VOA 13 becomes the dead loss state.

When the fast response VOA 13 is in the dead loss state and the fast power fluctuation occurs in the received light due to the transient, the set KIT value becomes less than 0 dB since the optical receiving device 1 is in the dead loss state. Therefore, the fast response VOA 13 maintains the current ATT value.

Then, the optical receiving device 1 calculates the second difference value based on (current power value−target power value) of the target channel, and calculates the set value of the TIA gain based on (−(second difference value)+current TIA gain value). When the optical receiving device 1 sets the TIA gain set value to the first to fourth TIAs 19A to 19D, the power fluctuation of each of electric signals of the first to fourth TIAs 19A to 19D becomes 0 dBm. As a result, the first to fourth TIAs 19A to 19D absorb fast power fluctuation.

The optical receiving device 1 of the second embodiment adjusts the gains of the first to fourth TIAs 19A to 19D such that the second difference value of the target channel is minimized in a case where the set ATT value is less than zero. As a result, the power fluctuation can be absorbed by the gain-adjustment of the first to fourth TIAs 19A to 19D only when the fast response VOA 13 is in the dead loss state. Therefore, the gain fluctuation of the TIA is reduced to the minimum, and thus the deterioration of the signal quality due to the frequency response fluctuation of the TIA and the IRN fluctuation can be reduced.

when the set ATT value is zero or more, the optical receiving device 1 sets the set ATT value to the fast response VOA 13. As a result, power fluctuation can be absorbed without using TIA gain-adjustment until attenuated by the fast response VOA 13. Therefore, by reducing the gain fluctuation of the TIA to the minimum, the deterioration of the signal quality due to the frequency response fluctuation of the TIA and the IRN fluctuation can be reduced.

The fast response VOA 13 sets the ATT value such that the signal light has a reception sensitivity equal to or more those of the first to fourth PDs 18A to 18D when converting the signal light into electric signals. As a result, power fluctuation can be absorbed.

The optical receiving device 1 acquires the four PI values of the I component and the Q component of the X-polarized component and the Y-polarized component of the target channel, and calculates, as the power value of the electric signals of the first to fourth PDs 18A to 18D, the average value of the four PI values. As a result, the optical receiving device 1 can calculate the power value of the target channel based on the PI values of the first to fourth TIAs 19A to 19D.

Note that the optical receiving device 1 has been exemplified as a case where the EDFA 12 is arranged between the input terminal 11 and the fast response VOA 13, but the input terminal 11 and the fast response VOA 13 may be directly connected without providing the EDFA 12, and the arrangement can be changed as appropriate.

Furthermore, each of the components of the units illustrated in the drawings does not necessarily need to be physically configured as illustrated in the drawings. In other words, for example, specific forms of separation and integration of the respective units are not limited to the illustrated forms, and all or some of the units may be functionally or physically separated and integrated in any unit according to various loads, use situations, and the like.

Moreover, all or some of various processing functions executed in the respective devices may be executed by a central processing unit (CPU) (or a microcomputer such as a micro processing unit (MPU) and a micro controller unit (MCU)). Furthermore, all or some of the various processing functions may of course be executed by a program analyzed and executed by a CPU (or a microcomputer such as an MPU and an MCU) or hardware using wired logic.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention, Although one or more embodiments of the present invention have been described in detail, it should be understood that the various changes, substitutions, and alterations could be made hereto without departing from the spirit and scope of the invention,

What is claimed is:

1. An optical apparatus comprising:
an attenuator configured to attenuate signal light that has been input;
a photoelectric convertor configured to convert the signal light attenuated by the attenuator into an electric signal;
an amplifier configured to adjust a gain of the electric signal; and
a processor configured to:
detect a monitor value of a target channel from an output signal of the amplifier,
calculate a power value of the target channel from the detected monitor value,
calculate a difference value between the power value and a target power value of the target channel,
calculate a set attenuation amount by adding a current attenuation amount, which is currently set to the attenuator, to the difference value,
control the gain of the amplifier so that the difference value of the target channel is minimized when the set attenuation amount is less than zero, and
set the set attenuation amount to the attenuator when the set attenuation amount is zero or more.

2. The optical apparatus according to claim 1, wherein the processor controls the gain of the amplifier so that so that the difference value of the target channel is minimized when the attenuator is in a dead loss state, in which the set attenuation amount is less than zero.

3. The optical apparatus according to claim 1, wherein the processor is further configured to:
detect, as the monitor value of the target channel, a gain value and a peak indicator (PI) value for each of a plurality of amplifiers including the amplifier, and
calculate the power value of the target channel based on an average value of the gain values of each of the plurality of amplifiers and an average value of the PI values of each of the plurality of amplifiers.

4. The optical apparatus according to claim 1, wherein the processor is further configured to:
detect, as the monitor value of the target channel, a peak indicator (PI) value for each of a plurality of amplifiers including the amplifier, and
calculate the power value of the target channel based on an average value of the PI values of each of the plurality of amplifiers.

5. An optical apparatus comprising:
an attenuator configured to attenuate input signal light that has been input;
an extractor configured to extract a first signal light having first modulation component of a target channel and a second signal light having a second modulation component of a target channel by making local oscillation light interfere with the signal light;
a first photoelectric converter configured to convert the first signal light into a first electric signal;
a second photoelectric converter configured to convert the second signal light into a second electric signal;
a first amplifier configured to adjust a first gain of the first electric signal;
a second amplifier configured to adjust a second gain of the second electric signal; and
a processor configured to:
detect a monitor value of respective the first modulation component and the second modulation component of target channel from an output signal of the first amplifier and the second amplifier,
calculate a power value of the target channel from the detected monitor values,
calculate a difference value between the power value and a target power value of the target channel,
calculate a set attenuation amount by adding a current attenuation amount, which is currently set to the attenuator, to the difference value,
control the first gain of the first amplifier and the second gain of the second amplifier so that the difference value of the target channel is minimized when the set attenuation amount is less than zero, and
set the set attenuation amount to the attenuator when the set attenuation amount is zero or more.

6. The optical apparatus according to claim 5, wherein the processor sets an attenuation amount of the attenuator to make the signal light have a reception sensitivity equal to or more than those of the first photoelectric converter and the second photoelectric converter when converting the signal light into electric signals.

7. The optical apparatus according to claim 5, wherein the processor controls the first gain of the first amplifier and the second gain of the second amplifier so that so that the difference value of the target channel is minimized when the attenuator is in a dead loss state, in which the set attenuation amount is less than zero.

8. The optical apparatus according to claim 5, wherein the processor is further configured to:
  detect, as the monitor value of the target channel, a gain value and a peak indicator (PI) value for each of a plurality of amplifiers including the first amplifier and the second amplifier, and
  calculate the power value of the target channel based on an average value of the gain values of each of the plurality of amplifiers and an average value of the PI values of each of the plurality of amplifiers.

9. The optical apparatus according to claim 5, wherein the processor is further configured to:
  detect, as the monitor value of the target channel, a peak indicator (PI) value for each of a plurality of amplifiers including the first amplifier and the second amplifier and
  calculate the power value of the target channel based on an average value of the PT values of each of the plurality of amplifiers.

10. An optical receiving method being performed by an optical apparatus, the method comprising:
  detecting a monitor value of a target channel from an output signal of an amplifier included in the optical apparatus,
  calculating a power value of the target channel from the detected monitor value,
  calculating a difference value between the power value and a target power value of the target channel,
  calculating a set attenuation amount by adding a current attenuation amount, which is currently set to an attenuator included in the optical apparatus, to the difference value,
  controlling the gain of the amplifier so that the difference value of the target channel is minimized when the set attenuation amount is less than zero, and
  setting the set attenuation amount to the attenuator when the set attenuation amount is zero or more.

* * * * *